Patented Sept. 5, 1944

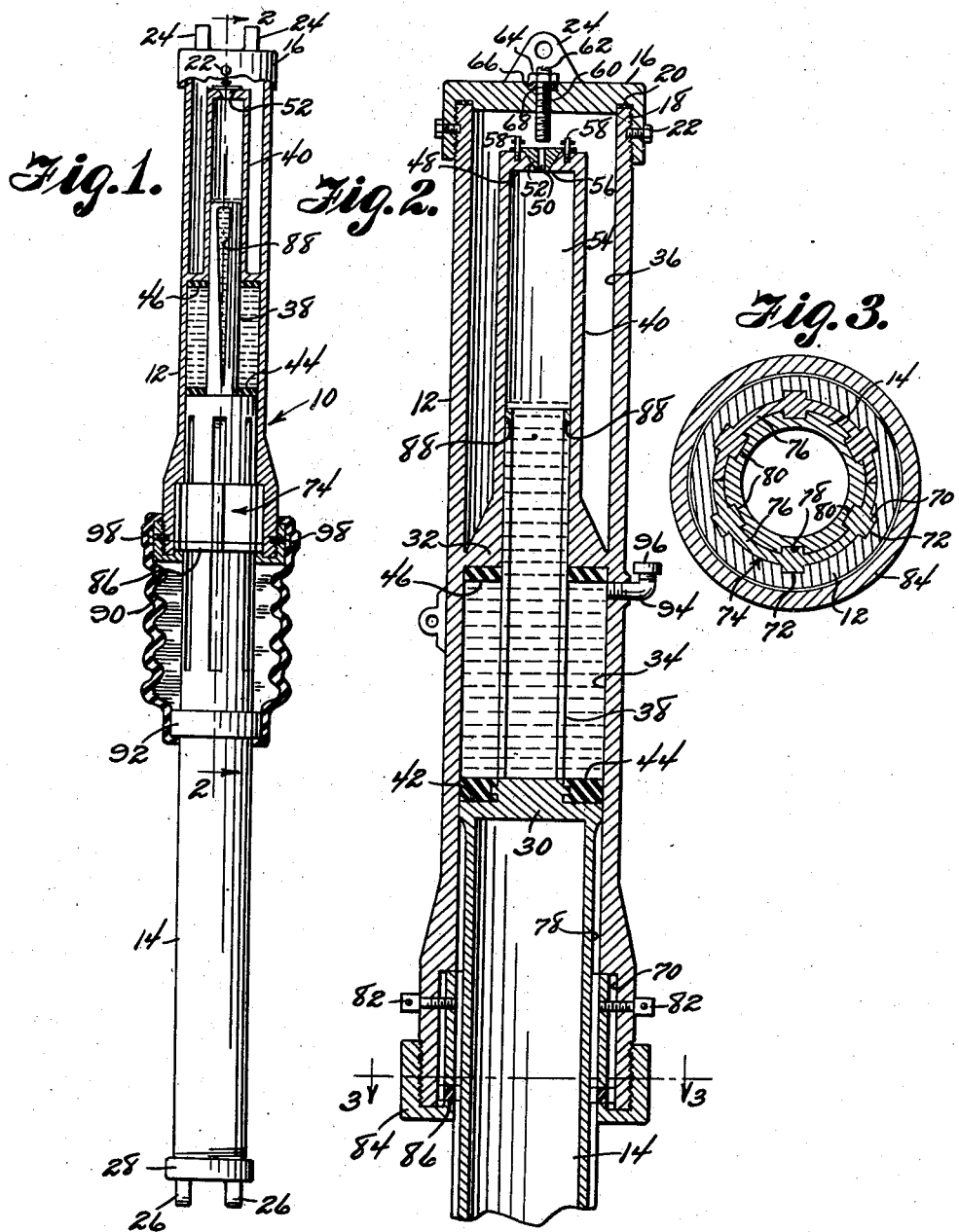

2,357,505

UNITED STATES PATENT OFFICE 2,357,505

SHOCK STRUT

Loren N. Crispell, Kingston, Pa.

Application February 27, 1943, Serial No. 477,427

10 Claims. (Cl. 267—64)

My invention relates to aircraft landing gears, and has among its objects and advantages the provision of an improved shock strut embodying telescopic members operating in conjunction with a damping fluid and air compressing means to perform shock absorbing functions, and in which the strut includes novel means for resisting twisting forces transmitted to the strut.

In the accompanying drawing:

Figure 1 is a partial longitudinal sectional view of a strut in accordance with my invention.

Figure 2 is an enlarged sectional view along the line 2—2 of Figure 1, and

Figure 3 is a sectional view along the line 3—3 of Figure 2.

In the embodiment of the invention selected for illustration, the strut 10 comprises a cylinder 12 and a piston member 14 slidable inside the cylinder. A cap 16 is threadedly connected at 18 with the upper end of the cylinder 12, and a sealing washer 20 is interposed between the cylinder and the cap to provide a pressure tight condition. This cap is restrained from accidental rotation by means of set screws 22. Attaching lugs 24 are fixed to the cap 16. Similar attaching lugs 26 are attached to the cap 28 threadedly connected with the lower end of the piston 14, this piston being of tubular formation but having a head 30 closing its inner end.

A partition 32 is formed integrally with the cylinder 12 and is located intermediate its ends to divide the latter into a fluid containing chamber 34 and an air compressing chamber 36. To the head 30 is fixedly attached a barrel 38 of smaller diameter than the inside diameter of the cylinder 12, which barrel slides inside an inner cylinder 40 comprising a fluid and air pressure chamber.

The cylinder 40 is arranged concentrically of the chamber 36 and is fixed to the partition 32. Upon the end 42 of the piston 14 and about the lower end of the barrel 38 is mounted a resilient washer 44 which is brought into engagement with a second resilient washer 46 attached to the partition 32, such engagement being consummated when the piston 14 is pushed inwardly to the limit of its stroke.

In the end 48 of the cylinder 40 is provided a tapered opening or valve seat 50. A valve body 52 of corresponding contour is adapted to lie at rest on the seat 50, but the body may be lifted therefrom in response to air pressure in the chamber 54 of the cylinder 40. A small opening 56 is provided in the body 52 so that the chambers 36 and 54 have limited communication at all times. Pins 58 are threaded into the end 48 and extend loosely through openings in the body 52, which pins act as guides for the body. The upward movement of the body 52 may be controlled by means of an adjusting screw 60 threaded through the cap 16 and provided with a screw driver slot 62 in its outer end. A lock nut 64 is threadedly connected with the screw 60 and bears against a resilient seal 66 lying in a recess 68 in the cap 16. Thus the screw 60 may be adjusted to different positions to vary the air bleeding capacity of the body 52 when the latter is lifted off its seat 50. The cylinder 12 has its lower end formed with an increased diameter for strengthening purposes, since the cylinder 12 is provided with six longitudinal grooves 70 for the reception of splines 72 on a fitting 74 comprising two sections 76, each embracing 180 degrees of the circumferential area of the piston 14. Grooves 78 are cut longitudinally in the piston 14 for the reception of splines 80 on the sections 76. The splines 72 restrain the fitting 74 from relative rotation inside the cylinder 12, and the splines 78 restrain the piston 14 from relative rotation with respect to the fitting. Thus the piston 14 is telescopically related to the cylinder 12 for relative longitudinal movement but is restrained from relative rotary motion. The fitting 74 is of such length and construction as to amply withstand any twisting or torsional forces transmitted to the parts.

While engagement between the washers 44 and 46 limit the relative inward movement of the cylinder and the piston, the grooves 78 in the piston 14 terminate short of its end 42, so that the upper end faces of the grooves may have engagement with the fitting 14 to limit the relative extension movement of the cylinder and the piston. Lubricant introducing fittings 82 are attached to the cylinder 12 and pass through the fitting 14 for applying lubricant to the piston and the fitting.

To the lower end of the cylinder 12 is threadedly connected a collar 84 between which and the lower end of the cylinder is interposed a sealing washer 86.

The barrel 38 is provided with fluid metering orifices 88 which extend substantially throughout the full length of the barrel. These orifices taper downwardly and place the chambers 34 and 54 in communication through the medium of the barrel.

A pleated rubber boot or cover 90 is attached to the collar 84 and a collar 92 attached to the piston 14 to provide a closure protecting the collar and that portion of the piston 14 which has sliding contact with the splined structure.

A filler pipe 94 is attached to the cylinder 12 and has communication with the chamber 34 adjacent the washer 46. This pipe is provided with a detachable dustproof cap 96. In supplying liquid to the strut, the cylinder and the piston are placed in their fully extended positions, at which time the fluid is poured in up to the level of the pipe 94. While fluid may pass into the chamber 54, the parts are so proportioned that the chamber 54 cannot completely fill with fluid, even though the cylinder 12 and its piston are in their fully telescoped positions. Set screws 98 are threaded through the collar 84 and into the cylinder 12 to hold the collar against accidental displacement.

The valve body 52 unseats as the air pressure is increased inside the chamber 54, thereby permitting rapid compression and slow expansion of air in the chamber 36, since the air in the chambers 36 when having higher pressure than the air in the chamber 54 can bleed only through the small opening 56 in the valve. This prevents the compressed air in the chamber 36 from causing rebound.

The axle (not shown) may be attached to the piston 14, as by welding.

Without further elaboration, the foregoing will so fully explain my invention, that others may, by applying current knowledge, readily adapt the same for use under various conditions of service.

I claim:

1. A shock strut comprising a cylinder having a partition dividing the cylinder into a fluid containing chamber and an air compression chamber, a piston slidable in said cylinder and defining one wall of said fluid containing chamber, means restraining the cylinder and said piston from relative rotary movement, a second fluid and air compression cylinder fixedly related to said first mentioned cylinder and opening through said partition, valve means for said second cylinder acting to cause a rapid flow of air from the second cylinder into said air compression chamber but a slow flow from the compression chamber into said second cylinder, and a barrel means fixedly related to said piston and slidable in said second cylinder, said barrel means having a passage placing said fluid chamber in communication with said second cylinder.

2. The invention described in claim 1 wherein said cylinder and said piston are respectively provided with attaching devices.

3. The invention described in claim 1 wherein said first mentioned means comprise a band like member interposed between said cylinder and said piston, coacting splines on said band like member and said piston, and coacting splines on said band like member and said cylinder.

4. The invention described in claim 1 wherein said valve means comprise a valve seat in said second cylinder and a weighted valve body gravitating to a position at rest on said seat and having a small port maintaining continuous communication between said second cylinder and said air chamber, and means for guiding said valve body when lifted off said seat through increased pressure in said second cylinder.

5. The invention described in claim 1 wherein said valve means comprise a valve seat in said second cylinder and a weighted valve body gravitating to a position at rest on said seat and having a small port maintaining continuous communication between said second cylinder and said air chamber, means for guiding said valve body when lifted off said seat through increased pressure in said second cylinder, and an adjustable means for limiting the movement of the valve body away from said seat.

6. The invention described in claim 1 wherein a flexible covering is attached to said cylinder and said piston for enclosing that portion of the piston having telescopic engagement with said first mentioned cylinder.

7. The invention described in claim 1 wherein resilient bumper means are respectively attached to said piston and said partition to limit the movement of said piston inwardly of said first mentioned cylinder.

8. The invention described in claim 1 wherein the passage in said barrel means comprises the tubular formation of the barrel means and a slot in the wall of the barrel means, said slot being of uniform taper toward said piston.

9. The invention described in claim 1 wherein said first mentioned means comprise two band sections interposed between said piston and said first mentioned cylinder, and coacting splines on said band sections and the piston and the first mentioned cylinder.

10. The invention described in claim 1 wherein a filler means is provided for said fluid chamber adjacent said partition.

LOREN N. CRISPELL.